(12) United States Patent
Umetsu

(10) Patent No.: US 8,098,052 B2
(45) Date of Patent: Jan. 17, 2012

(54) BATTERY CHARGER

(75) Inventor: Koji Umetsu, Miyagi (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 12/176,448

(22) Filed: Jul. 21, 2008

(65) Prior Publication Data

US 2009/0027011 A1 Jan. 29, 2009

(30) Foreign Application Priority Data

Jul. 25, 2007 (JP) ................... 2007-193326

(51) Int. Cl.
*H02J 7/04* (2006.01)
*H02J 7/06* (2006.01)
(52) U.S. Cl. ......... 320/162; 320/145; 320/148; 320/164
(58) Field of Classification Search .................. 320/107, 320/162
See application file for complete search history.

(56) References Cited

U.S. PATENT DOCUMENTS

| 5,408,170 | A | | 4/1995 | Umetsu et al. | |
|---|---|---|---|---|---|
| 5,465,039 | A | * | 11/1995 | Narita et al. | 320/164 |
| 6,005,371 | A | * | 12/1999 | Umetsu | 320/148 |
| 2005/0243551 | A1 | | 11/2005 | Onishi et al. | |
| 2008/0252265 | A1 | * | 10/2008 | Kokubun et al. | 320/162 |

FOREIGN PATENT DOCUMENTS

| JP | 6-014473 | 1/1994 |
|---|---|---|
| JP | 2007-020299 | 1/2007 |

OTHER PUBLICATIONS

Japanese Office Action issued on Jun. 30, 2009, for corresponding Japanese Patent Application JP 2007-193326.

* cited by examiner

*Primary Examiner* — Edward Tso
*Assistant Examiner* — Johali Torres Ruiz
(74) *Attorney, Agent, or Firm* — K&L Gates LLP

(57) ABSTRACT

A batter charger for charging a secondary batter using a power supply circuit which converts an AC input into a DC output, includes a first resistor for detecting constant-current control and a second resistor for detecting end of charging. The first resister and the second register are inserted in series in a current path of the charging current. The power supply circuit has output characteristics of a constant-current control characteristic and a constant-voltage control characteristic. The constant-current control is performed using a first detection voltage generated at the first resistor, and the constant-voltage control is performed by comparing a second detection voltage generated at a series resistor composed of the first resistor and the second resistor with a reference voltage using a comparator, and detecting an end of charging indicated by the second detection voltage fallen below the reference voltage.

6 Claims, 5 Drawing Sheets

BATTERY CHARGER

CROSS-REFERENCE TO RELATED APPLICATIONS

The present application claims priority to Japanese patent Application No. 2007-193326 filed in the Japanese Patent Office on Jul. 25, 2007, the entire disclosure of which is incorporated herein by reference.

BACKGROUND

The present application relates to a batter, charger for a charging battery pack of secondary batteries.

Battery chargers for charging secondary, batteries using commercial power sources have been known. The present inventors have already proposed a battery charger described in Japanese Patent No. 3430264 (Japanese Unexamined Patent Application Publication (KOKAI) No. H06-14473: Patent Document 1).

FIG. 1 shows a configuration similar to that shown in the Patent Document 1. Commercial alternating current (referred to as "AC" for convenience' sake, hereinafter) power source is converted into a DC power source by an input filter 1 and a rectifier circuit 2. A switching power source includes a pulse width modulation control circuit 3, a transistor Q1, and a transformer T1. The transistor Q1 as a switching element performs switching operation, for example, at 100 kHz, by output pulses from the pulse width modulation control circuit 3. Rectified output of a diode D1 and a capacitor C1, connected to a tertiary winding N3 of the transformer T1, is supplied as a power source of the pulse width modulation control circuit 3.

The transistor Q1 regulates current flowing through a primary winding N1, and correspondent electric power is induced on a secondary winding N2 and the tertiary winding N3. A voltage induced on the secondary winding N2 is rectified by a diode D2 and a capacitor C2 to obtain a rectified output Vo. The rectified output Vo is extracted through a switching unit 4 composed of an FET F1, an FET F2, and a transistor Tr1 and the like, between output terminals 5a [positive(+)side] and 5b [negative(−)side].

A secondary battery BAT such as a lithium ion secondary battery, is connected between the output terminals 5a and 5b. The secondary, battery BAT is connected in attachable/detachable manner to/from the battery charger. The battery charger includes a switch SW for detecting attachment/detachment of the secondary battery BAT. Upon attachment of the secondary battery BAT, the switch SW turns on, and a detection signal Batt at L (which means LOW level, the same applies hereinafter), indicating that the secondary battery BAT is attached, is supplied to a controller 11 composed of a microcomputer.

The rectified output Vo is divided by a resistor R7 and a resistor R8 to input to the negative(−)terminal of an operation amplifier AMP1. On the other hand, the positive(+)terminal of the operation amplifier AMP1 is supplied with a reference voltage REF1. The output voltage Vo is compared with the reference voltage REF1, and an error signal indicating difference from the reference voltage is supplied to a photocoupler PH1 via a diode D3.

The error signal transmitted from the secondary side to the primary side of the photocoupler PH1 is supplied to the pulse width modulation control circuit 3. The pulse width modulation control circuit 3 controls an ON period of output pulses from the transistor Q1, so as to control electric power to be supplied to the secondary side, whereby an output voltage set by the reference voltage on the secondary side is extracted.

An output (charge) current Io is detected by a resistor R2. The load-side (output-side) terminal of the resistor R2 is connected to the negative terminal of an operation amplifier AMP2 via a resistor R5. A voltage obtained by dividing the reference voltage REF1 by resistors R4 and R6 is supplied to the positive terminal of the operation amplifier AMP2, to thereby raise voltage level at the positive terminal of the operation amplifier AMP2.

Flow of output current Io induces voltage drop over the resistor R2 ascribable to the output current Io. As a consequence, a voltage divided be the resistors R4 and R6 decreases. Increase in the output current Io causes further voltage drop at the positive terminal of the operation amplifier AMP2. When the potential at the positive terminal of the operation amplifier AMP2 falls down to the potential at the negative terminal or therebelow, the output signal from the operation amplifier AMP2 shifts from H (which means HIGH level, the same applies hereinafter) to L.

The output signal from the operation amplifier AMP2 is supplied to the pulse width modulation control circuit 3 via a diode D4 and a photocoupler PH1, so that the power control is performed similarly to voltage control. More specifically, voltage drop occurs at the positive terminal of the operation amplifier AMP2 depending on the amount of current flowing through the resistor R2, the potential of the positive terminal is compared with that of the negative terminal, and the amount of output current is controlled to keep voltage generated at the resistor R2 constant. The output current is regulated at a constant level in this way.

A predetermined voltage stabilized from an output voltage $V_o$ by the regulator 12 is supplied to the controller 11 as a source voltage. An LED (light emitting diode) 13 as a display element, indicating the state of charging operation, is connected to the controller 11.

The switching unit 4 is operated by drive pulse signals DR1, DR2, and DR3 outputted from the controller 11. When the controller 11 detects the attachment of the secondary battery BAT by receiving the detection signal Batt, charging operation starts to perform a predetermined charging operation under monitoring of battery voltage Vbatt.

The above-described battery charger charges the secondary battery BAT based on a CC-CV (constant current-constant voltage) charging system, which is a combined system of constant-current charging and constant-voltage charging. FIG. 2 shows output characteristics of the above-described battery charger. The abscissa represents charging current, and the ordinate represents charging voltage. The battery charger first operates in the constant-current control mode, for example, at 1.0 A, and then operates in the constant-voltage control mode, for example, at 4.2 V. In the initial charging mode in the early stage of charging, the charging at initial charging current $I_f$ is proceeded. When the voltage reaches a rapid switching voltage, for example, at 2.7 V, the charging mode switches to a rapid charging mode.

FIG. 3 shows time-dependent changes(charging curve) in the charging voltage and charging current during charging. For example, the constant-current control proceeds in a region where the battery voltage is as high as the constant-voltage control voltage (4.2 V, for example) or below, whereby the constant-current charging is performed under a constant current (1.0 A, for example). When the battery voltage (internal electromotive force) elevates to reach 4.2 V as a result of charging, the battery charger switches the operation into those under the constant-voltage control, whereby the charging current gradually decreases. When the charging current is detected to reach the end-of-charging detection value $I_s$, the end-of-charging is detected. From this point in time, a float timer activates, and the battery is charged until the time-out to terminate the charging of the battery. The charging adopts the floating timer, because the capacity may slightly be increased even after the point in time when the end-of-charging is detected.

In the configuration shown in FIG. 1, during the constant-current charging, the output of the operation amplifier AMP2 is supplied to the photocoupler PH1 via the diode D4, and the power source is regulated to give constant output current. During the constant-voltage charging, the output of the operation amplifier AMP1 is supplied to the photocoupler PH1 via the diode D3, and the power source is regulated by the output voltage of the operation amplifier AMP1 so as to give constant output voltage Vo. In the configuration shown in FIG. 1, one end of the load-side of the current detecting resistor R2 is connected to the negative terminal of the comparator 6, the other end of the load-side is connected to the negative side of a reference voltage REF2, and the positive side of the reference voltage REF2 is connected to the positive terminal of the comparator 6. The charging current is converted into voltage by the resistor R2, and the voltage is compared with the reference voltage REF2. When the charging current decreases, the reference voltage at the positive terminal of the comparator 6 becomes larger than the detection voltage at the negative terminal thereof, whereby an output Cs of the comparator 6 inverts. The output Cs of the comparator 6 is supplied to the controller 11, and the controller 11 detects the end of charging.

The known battery charger which detects the end of charging in this way needs to provide the reference voltage REF2 for detecting end of charging, and needs to use a precision-offset comparator having a small offset voltage as the comparator 6 for detecting end of charging, which is an expensive component.

A similar battery charger is described also in Japanese Unexamined Patent Application Publication (KOKAI) No. 2007-20299 (Patent Document 2).

The Patent Document 2 proposes a method of improving sensitivity of current detection. The method is performed by switching the resistance value for detecting charging current to a larger value when the charging current decreases to fall below a set value. In this case, a change-over switch for changing the resistance value is necessary. In any attempt of using, for example, an FET element for the switch, it is necessary to select an FET considerably small in the resistance value, which leads to require an expensive FET.

SUMMARY

Accordingly, it is desirable to provide a battery charger, which may be configured at low cost, without using any expensive elements or change-over switch in a configuration for detecting the end of charging.

In accordance with an embodiment, a battery charger for charging a secondary battery using a power supply circuit which converts an AC input into a DC output, is provided which includes a first resistor for detecting constant-current control and a second resistor for detecting end of charging. The first register and the second register are inserted in series in a current path of the charging current. The power supply circuit has output characteristics of a constant-current control characteristic and a constant-voltage characteristic. The constant-current control is performed by using a first detection voltage generated at the first resistor. The constant-voltage control is performed by comparing a second detection voltage generated at a series resistor composed of the first resistor and the second resistor with a reference voltage using a comparator, and detect an end of charging indicated by the second detection voltage fallen below the reference voltage.

According to an embodiment, it is possible to increase detection level of current when the charging completes, so that the use of an expensive small-offset comparator may become unnecessary. Consequently, a low-cost battery, charger can be implemented, and the reference voltage REF2 may be set more easily.

Furthermore, according to an embodiment, the detecting resistor for detecting constant-current control and the resistor for detecting end of charging are connected in series, whereby providing advantages in that current value for constant-current control and current value for end-of-charging detection may independently be set by setting a resistance value of the individual resistors, without altering the internal reference voltage level, and in that the degree of freedom in designing current setting may be expanded, making the setting more easier.

The battery charger may include a forward-biased diode to a charging current, which is connected in parallel with the resistor for end-of-charging detection. According to such construction, if voltage generated at the resistor becomes equal to or larger than the forward-biased voltage drop of the diode, the current may be bypassed via the diode. As a result, the loss of resistance value may be reduced.

Additional features and advantages are described herein, and will be apparent from the following Detailed Description and the figures.

DETAILED DESCRIPTION

Figure 4:
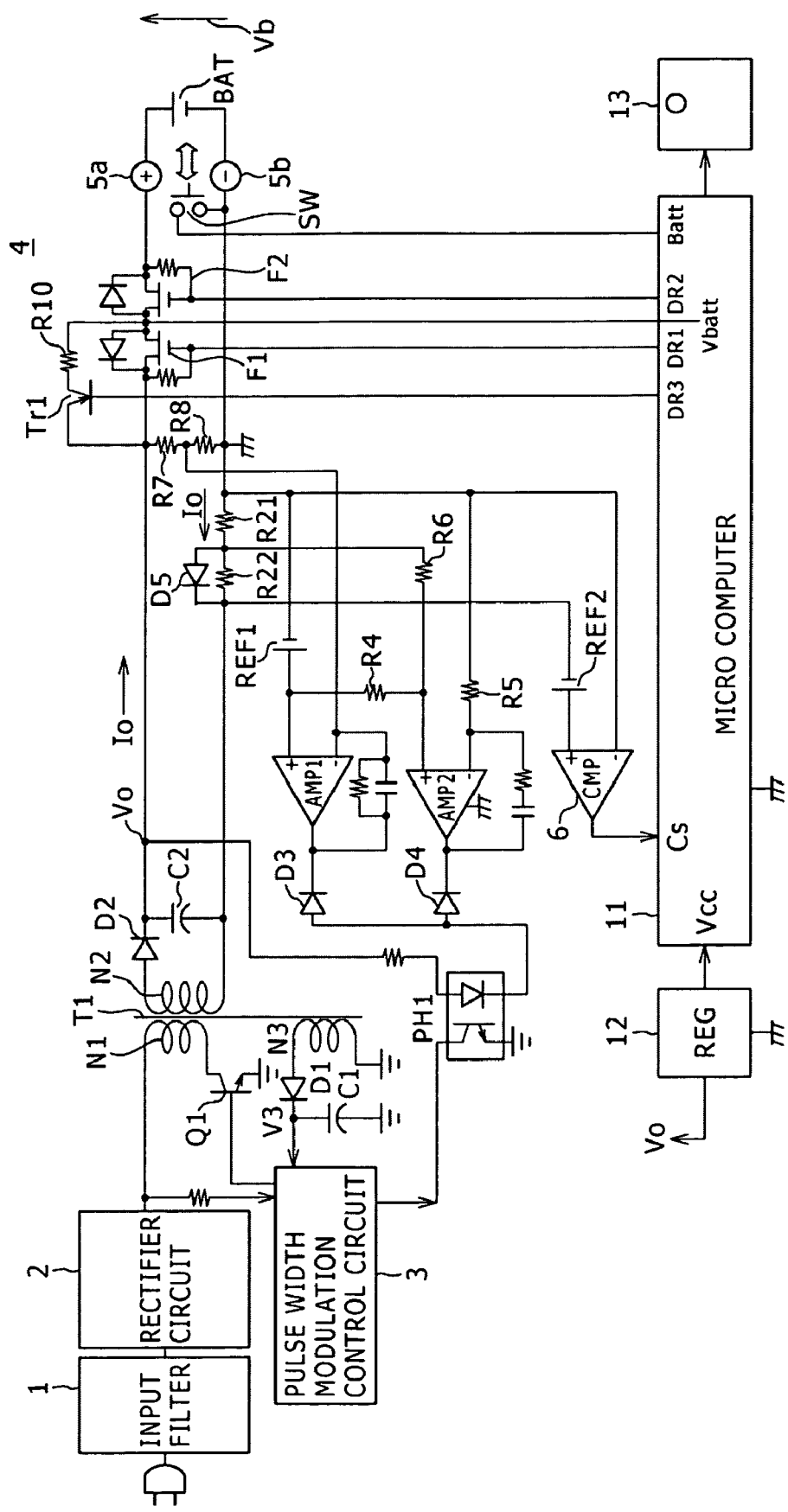
FIG. 4 is a connection diagram of a battery charger according to an embodiment.

Paragraphs below will explain an embodiment, referring to FIG. 4. A battery charger shown in FIG. 4 has a configuration improved from the known battery charger shown in FIG. 1, and charges the secondary battery BAT based on a CC-CV (constant current-constant voltage) charging system, which is a combined system of constant-current charging and constant-voltage charging. An output voltage Vo rectified by the diode D2 and the capacitor C2 is applied to both ends of the secondary battery BAT via the switching unit 4.

The change of the output voltage Vo is detected by the resistor R7, the resistor R8, the operation amplifier AMP1, and the reference voltage REF1, and is regulated to keep a desired voltage by the pulse width modulation control circuit 3.

In an embodiment, a resistor R22 for detecting end of charging is connected in series to a resistor R21 for detecting charging current. In parallel with the resistor R22, a forward-biased diode with respect to the charging current Io, which is a Schottky diode D5, for example, is connected.

Figure 1:
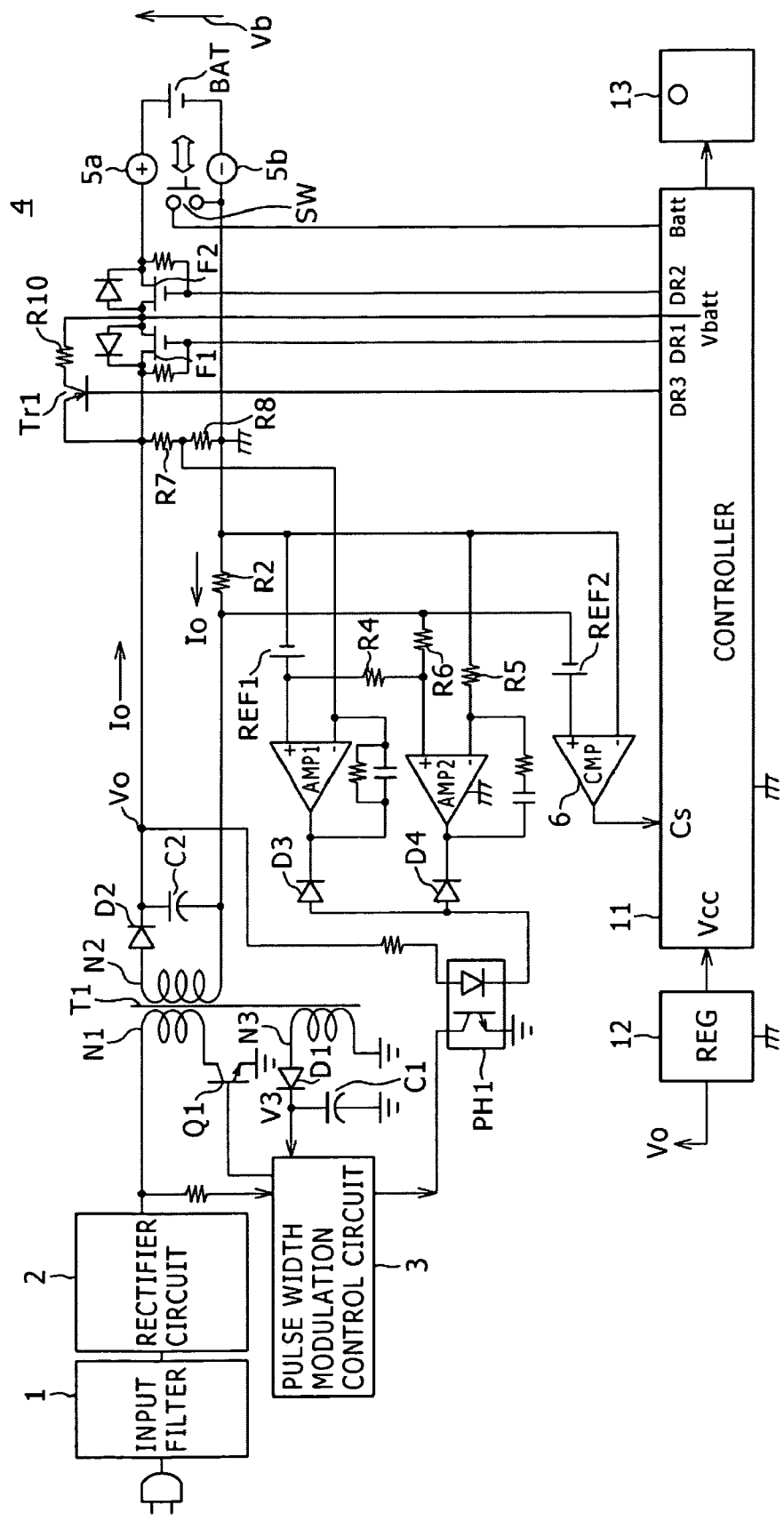
FIG. 1 is a connection diagram of an example of a known battery charger.
Figure 2:
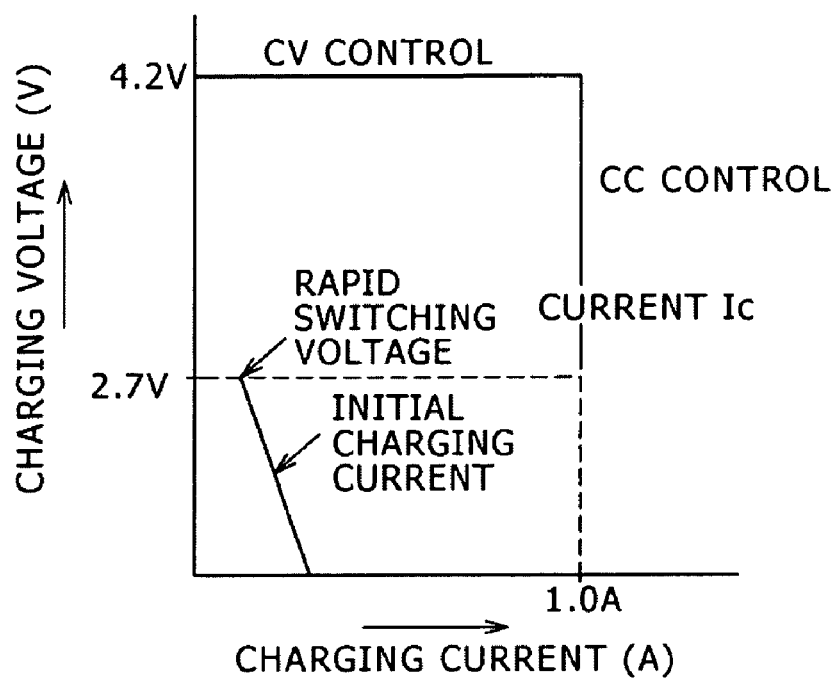
FIG. 2 is a chart showing the output characteristics of the known battery charger.
Figure 3:
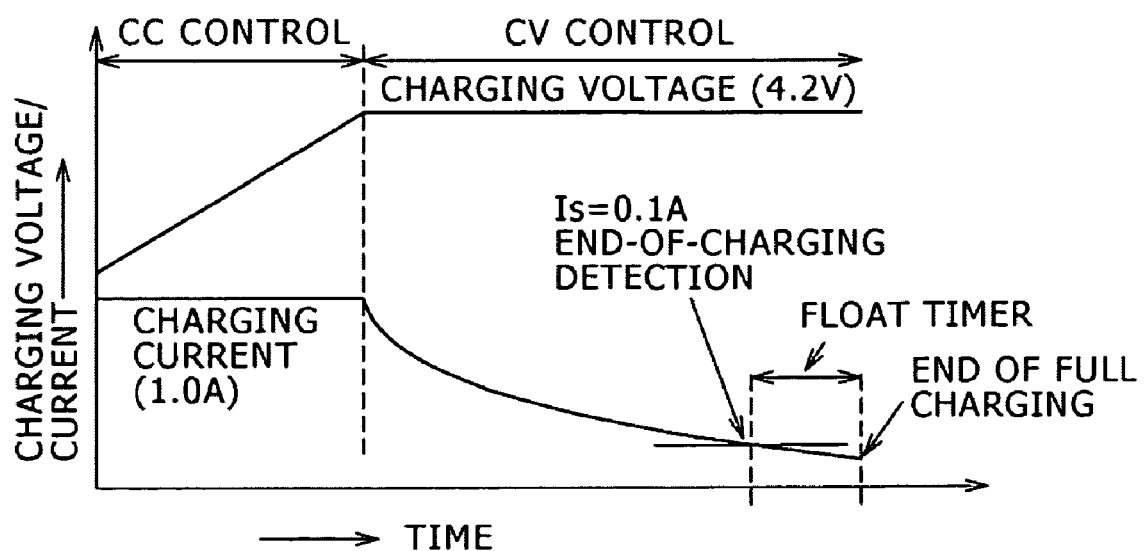
FIG. 3 is a chart showing voltage and current changes during the charge operation of the known battery charger.

The resistor R21 corresponds to the resistor R1 in the configuration of FIG. 1. More specifically, the load-side (output-side) terminal of the resistor R21 is connected to the negative terminal of the operation amplifier AMP2 via the resistor R5, whereas the positive terminal of the operation amplifier AMP2 is supplied with the voltage obtained by dividing the reference voltage REF1 by the resistors R4 and R6, whereby the potential at the positive terminal of the operation amplifier AMP2 is elevated.

The voltage drop ascribable to the output current occurs at the resistor R21 by flowing the output (charge) current Io. As a consequence, the voltage divided by the resistors R4 and R6 is lowered. Furthermore, the increase in the output current Io further lowers voltage at the positive terminal of the operation amplifier AMP2. When the positive terminal of the operation amplifier AMP2 is brought dose to the same potential as the negative terminal thereof or below, the output signal of the operation amplifier AMP2 shifts from H to L.

The output signal of the operation amplifier AMP2 is supplied to the pulse width modulation control circuit 3 via the diode D4 and the photocoupler PH1, whereby the power control is performed by the pulse width modulation circuit 3 on the primary side, similarly to voltage control. More specifically, the positive terminal of the operation amplifier AMP2 causes voltage drop depending on the amount of current flowing through the resistor R21, the resultant potential is compared with that of the negative terminal, and the amount of output current is then controlled so as to keep voltage generated at the resistor R21 constant. Thus, the output current is regulated at a constant value.

One end of the power source side (input side) of the resistor R22 is connected to the negative side of the reference voltage REF2, and the positive side of the reference voltage REF2 is connected to the positive terminal of the comparator 6. The negative terminal of the comparator 6 is connected to one end of the load-side (output-side) of the resistor R21. The comparative output Cs of the comparator 6 is supplied to the controller 11.

When the output current Io is large, the comparative output Cs of the comparator 6 is L, whereas if the output current Io falls below a predetermined current value, which is 0.1 A, for example, the output of the comparator 6 goes H. As a result, the device enters the end-of-charging detection mode.

A transistor Tr1, the FET F1, and the FET F2 contained in the switching unit 4 are switched respectively by the drive signals DR1, DR2, and DR3 outputted from the controller 11. The controller 11 is supplied with the detection signal Batt generated by the switch SW which indicates whether the secondary battery BAT is attached. The battery voltage Vbatt is extracted from the connection point of the FET F1 and the FET F2 connected in series, and the battery voltage Vbatt is then supplied to the controller 11. The LED 13 indicating the state of charging is connected to the controller 11.

Figure 5:
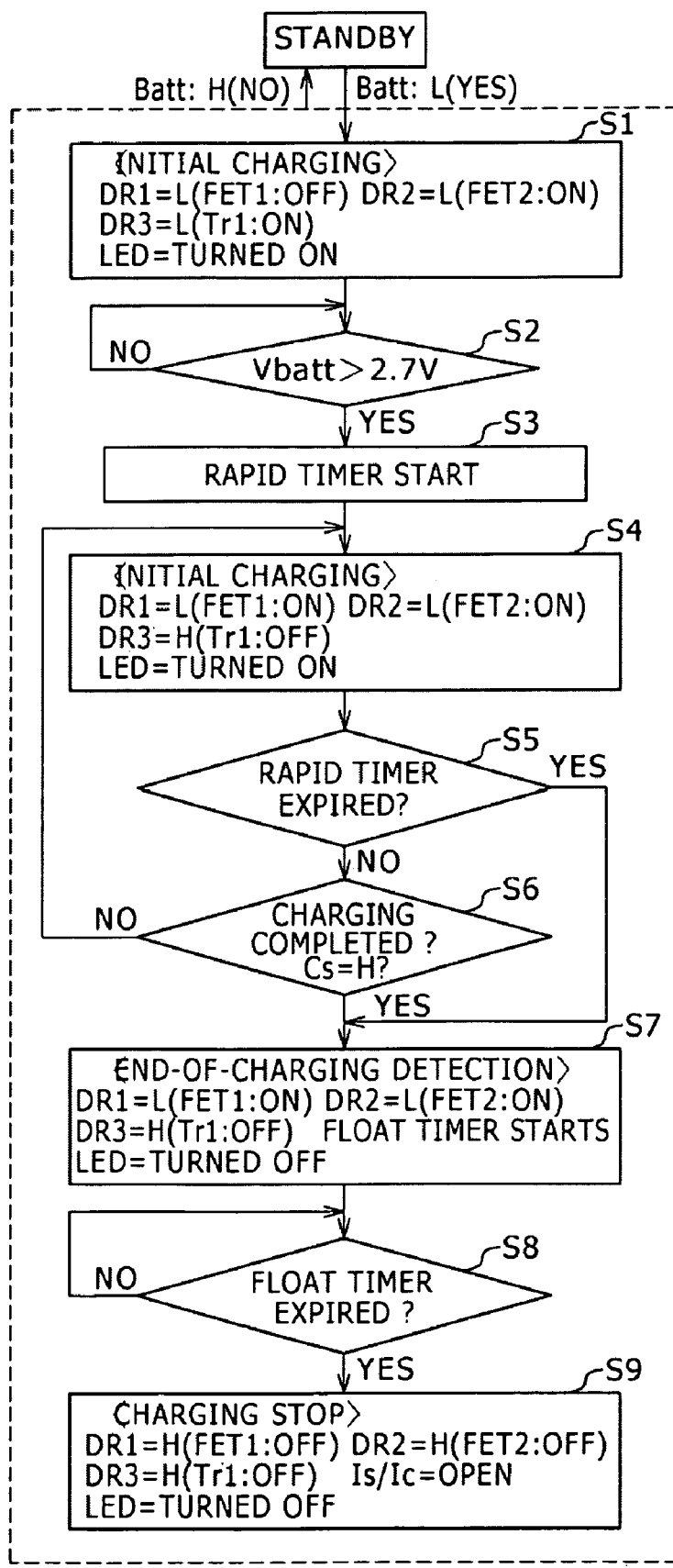
FIG. 5 is a flowchart illustrating processes according to an embodiment.

The charging control by the controller 11 will be explained, referring to a flowchart shown in FIG. 5.

Upon detecting attachment of the secondary battery BAT by the switch SW, the detection signal Batt goes L, whereby the charging operation starts.

In step S1, the drive signal DR1 goes H to thereby turn FET F1 off, the drive signal DR2 goes L to thereby turn the FET F2 on, and the drive signal DR3 goes L to thereby turn the transistor Tr1 on. As a consequence, the secondary battery BAT is initially charged through the transistor Tr1, a resistor R10, and the FET F2. In the initial charging mode, the LED 13 kept turned off in the standby mode illuminates.

The initial charging current If is expressed by the equation (1) below. In the equation (1), Vtr represents emitter-collector voltage of the transistor Tr1.

$$If = (Vo - Vtr)/R10 \qquad (1)$$

In step S2, whether the battery voltage Vbatt exceeds a predetermined voltage, which is 2.7 V, for example, is judged. When the battery voltage Vbatt is judged as exceeding the predetermined voltage, which is 2.7 V, for example, a rapid timer activates in step S3, whereby the device enters a rapid charging mode.

In the rapid charging mode (step S4), the drive signal DR1 goes L to thereby turn the FET F1 on, the drive signal DR2 goes L to thereby turn the FET F2 on, and the drive signal DR3 goes H to thereby turn the transistor Tr1 off. As a consequence, the secondary battery BAT is charged through the FET F1 and the FET FF2. In the rapid charging mode, the LED 13 is kept illuminated.

In the rapid charging mode, whether the rapid timer has expired is judged in step S5. If the rapid timer is judged as having not expired, the end-of-charging is judged in step S6. If the charging current falls below a predetermined value, which is 0.1 amperes, for example, and the end-of-charging is judged, the detection signal Cs of the comparator 6 goes H. If the rapid timer has not expired and the end-of-charging is not detected, the rapid charging mode in step S4 continues.

If it is judged by the rapid timer as having expired in step S5, or if the end-of-charging is detected in step S6, the device enters the end-of-charging detection mode in step S7. In the end-of-charging detection mode, the drive signal DR1 goes L to thereby turn the FET F1 on, the drive signal DR2 goes L to thereby turn the FET F2 on, and the drive signal DR3 goes H to thereby turn the transistor Tr1 off, and a timer for float charging (float timer) activates. As a consequence, the secondary battery BAT is charged through the FET F1 and the FET FF2. In the end-of-charging detection mode, the LED 13 is turned off. The end-of-charging is informed to the user by the lights-out of the LED 13.

In step S8, whether the float timer has expired (time-out) is judged. If the float timer is judged as having expired, the device enters a charging stop mode in step S9. In the charging stop mode, the drive signal DR1 goes H to thereby turn the FET F1 off, the drive signal DR2 goes H to thereby turn the FET F2 off, and the drive signal DR3 goes H to thereby turn the transistor Tr1 off. By turning the switching unit 4 off, the charging current is interrupted, and the charging of the secondary battery BAT comes to the end. The LED 13 is still kept turned off.

Figure 6A:
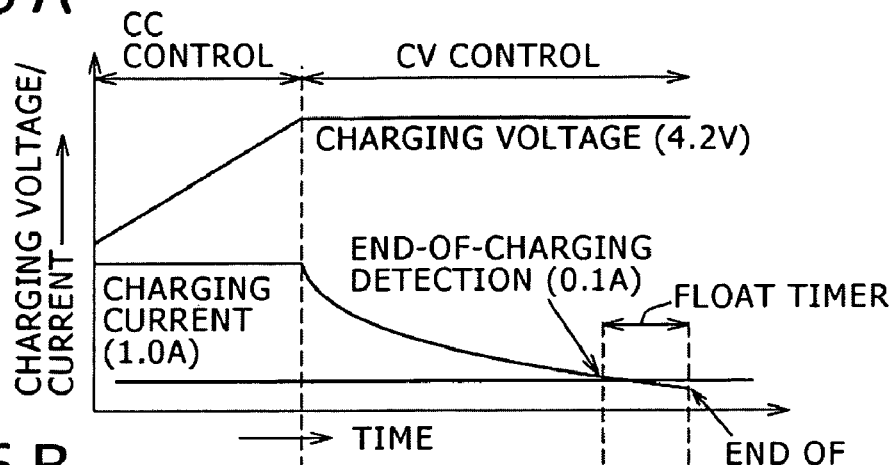
FIGS. 6A and 6B are graphs showing voltage and current changes at the individual components according to an embodiment.

As shown in FIG. 6A, the constant-current charging proceeds in the region where the battery voltage is lower than the constant-voltage control voltage (4.2 V, for example), and thus the constant-current charging is performed under a constant charging current (1.0 A, for example). If the battery voltage V (internal electromotive force) elevates to reach 4.2 V as a result of charging, the battery charger switches its operations into those of the constant-voltage control, whereby the charging current gradually decreases. When the charging current is detected as having reached the end-of-charging detection value Is, the end-of-charging is detected. From this point in time, a float timer is activated, and the battery is charged until the time-out to terminate the charging of the battery. These charging operations are similar to those take place in the battery charger shown in FIG. 1.

Figure 6B:
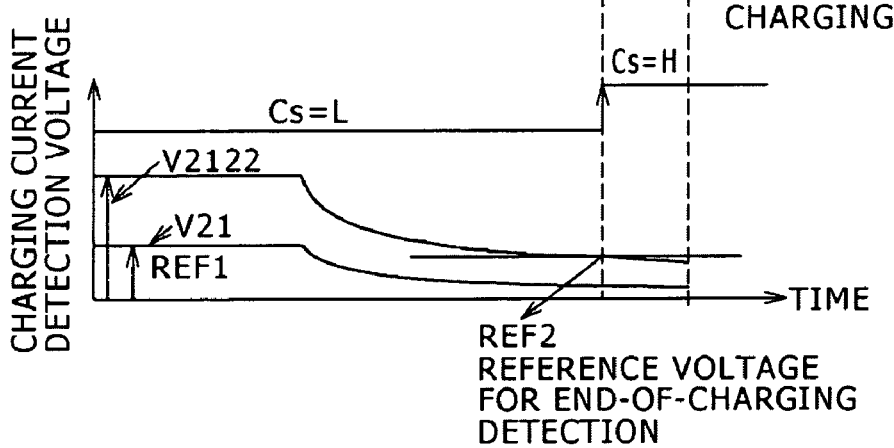

FIG. 6B shows voltage changes on both ends of the resistor R21 for detecting charging current, and voltage changes on both ends of the series circuit (end-of-charging detecting circuit) composed of the resistor R21 for detecting charging current and the resistor R22 for detecting end of charging. Exemplary conditions include R21=0.1 Ω, R22=0.9 Ω, rapid charging current Ic=1.0 A, and end-of-charging current Is=0.1 A.

In the period of constant-current control in which the charging current is kept constant at 1.0 A, voltage drop (detection voltage V21=Ic×R21=1.0 A×0.1 Ω=0.1 V) occurs at the resistor R21. The resultant 0.1 V is set equal to the reference voltage to be inputted to the positive terminal of the operation amplifier AMP2, whereby a charging current of 1.0 A flows through the resistor R21. As a result, the potential at the positive terminal of the operation amplifier AMP2 goes down to reach the same potential as the negative terminal of the operation amplifier AMP2, whereby the power control such as keeping the charging current 1.0 A unchanged is performed.

At this time, the voltage drop (detection voltage V2122=Ic×(R21+R22)=1.0 A×(0.1+0.9)Ω=1.0 V) occurs at the series circuit composed of the resistors R21 and R22. This voltage is applied to the negative terminal side of the reference voltage REF2. The detection voltage V2122, which generates between the resistors R21 and R22 connected in series, is compared by the comparator 6 with the reference voltage REF2. Because the series resistor circuit has a larger resistance value than that of the single resistor R21, the detection voltage V2122 becomes larger than the detection voltage V21. In the constant-current charging, the output Cs of the comparator 6 is L.

When the mode shifts from the constant-current charging to the constant-voltage charging, the charging current gradually decreases, whereby the detection voltage V2122 decreases. When the charging current falls down to the end-of-charging current Is=0.1 A or below, V2122 is given as (V2122=0.1 A×(0.1+0.9) Ω=0.1 V). The voltage having the same value as this voltage is given as the reference voltage REF2 connected to the positive terminal side of the comparator 6. In this case, the output level of the comparator 6 shifts from L to H. If judges as the shift of the output level of the controller 11 from L to H, the device enters the end-of-charging detection mode.

Referring now to the known battery charger shown in FIG. 1, the detection of the constant current Ic and the end-of-charging current Is using the resistor R2 will be discussed under the conditions same as those described in the above, assuming resistors as R2=R21=0.1 Ω, and voltage drop V2 occurs at the resistor R2. Since the current value at the end of charging is Is=V2/R2, (V2=Is×R2=0.1 A×0.1 Ω=0.01 V) is given.

This voltage value is only 1/10 as large as V2122=0.1 V which is the above-described voltage value in one embodiment. This means that it is necessary to set the reference voltage REF2 for end-of-charging detection to an extremely small value, and to use a precision-offset comparator having a small offset voltage, and is therefore expensive, as the comparator 6. An embodiment of the present application can solve this problem, and improves accuracy of the end-of-charging detection.

Figure 7:
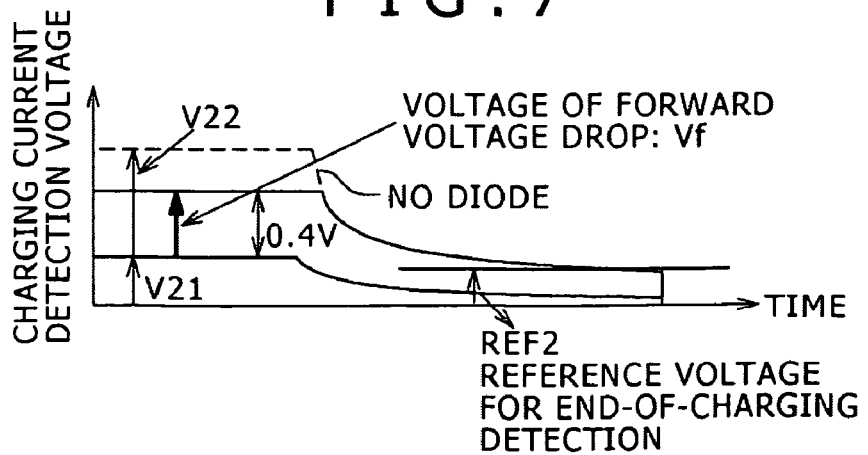
FIG. 7 is a graph showing voltage and current changes at the individual components, obtained when a Schottky diode connected in one embodiment.

Moreover, an embodiment can reduce power loss at the resistor R22, because the Schottky diode D5 is connected in parallel with the resistor R22. The detection voltage V2122 shown in FIG. 6B is obtained in the absence of the Schottky diode D5, and is given as V2122=0.9 V under the constant-current control. The forward-biased voltage drop Vf caused by the Schottky diode D5 is 0.4 V, for example. As shown in FIG. 7, the detection voltage V2122 is suppressed to as low as 0.4 V or below by the Schottky diode D5. As a consequence, the loss at the resistor R22 may be halved or below. Any diodes other than Schottky diode may be adoptable, wherein those causative of possibly minimum forward-biased voltage drop may be preferable in view suppressing the loss.

An embodiment of described in the above may take effects as below.

1) By virtue of the configuration in which the resistor R22 is connected in series with the current-detecting resistor R21 for constant-current control, and voltage generated at the series resistors (R21+R22) is compared with the reference voltage REF2 using the comparator, the detection level of at the end of charging may be elevated, whereby comparators of the general offset level may be adoptable. Accordingly, the reference voltage REF2 may be set more easily.

2) The current of the constant-voltage control may be set by the resistance value of the resistor R21, and also the current value of the end-of-charging detection may be set by the resistance value of the resistor R22 connected in series thereto, so that the degree of freedom in setting current may be expanded without altering the internal reference voltage value, which brings about advantageous of facilitating the circuit design.

3) By connecting the diode D5 in parallel with the resistor R22 added in series for the end-of-charging detection, the current may be bypassed through the diode if voltage generated at the resistor R22 becomes equal to or larger than the forward-biased voltage drop of the diode, so that the loss occurred at the resistor R22 may be reduced. Reduction of the loss occurred at the resistor R22 may provide significant advantages, under relatively large charging current.

For example, a plurality of secondary batteries may be charged at a time, and the power supply circuit outputting the charging voltage and charging current may be anything other than those shown in one embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery charger for charging a secondary battery using a power supply circuit which converts an AC input into a DC output, the battery charger comprising:
   a first resistor for detecting a charging current associated with a constant-current control; and
   a second resistor for detecting end of charging,
   wherein the first resistor and the second resistor are inserted in series in a current path of the charging current, and
   wherein the power supply circuit has output characteristics of a constant-current control characteristic and a constant-voltage control characteristic,
   the constant-current control is performed using a first detection voltage generated at the first resistor, and
   the constant-voltage control is performed by comparing a second detection voltage generated at a series resistor composed of the first resistor and the second resistor with a reference voltage using a comparator, and detecting an end of charging indicated by the second detection voltage fallen below the reference voltage.

2. The battery charger as claimed in claim 1, further comprising a forward-biased diode to a charging current, the forward-biased diode being connected in parallel with the second resistor, and when a voltage generated at the second resistor becomes no less than a forward-biased voltage drop of the diode, the charging current is bypassed by the diode to reduce a loss at the second resistor.

3. The battery charger as claimed in claim 2, wherein the diode is a Schottky diode.

4. The battery charger as claimed in claim 1, wherein a third detection voltage is generated from an output voltage of the power supply circuit to perform the constant-voltage control using the third detection voltage.

5. The battery charger as claimed in claim 1, wherein a current value for the constant-current control is set in accordance with a resistance value of the first resistor, and a current value for end-of-charging detection is set in accordance with a resistance value of a series resistance composed of the first resistor and the second resistor.

6. The battery charger as claimed in claim 1, further comprising a pulse width modulation control circuit for power control of the power supply circuit, wherein the pulse width modulation control circuit is isolated from the first and second resistors by a transformer, and the first detection voltage is supplied to the pulse width modulation control circuit via a photocoupler.

* * * * *